Feb. 27, 1968

G. SEEWALD 3,371,335

SYSTEM FOR MEASURING OF LENGTHS BY MEANS OF IMPULSE COUNTING

Filed June 5, 1964

INVENTOR.
GERHARD SEEWALD

BY

ATTORNEY.

Feb. 27, 1968     G. SEEWALD     3,371,335
SYSTEM FOR MEASURING OF LENGTHS BY MEANS
OF IMPULSE COUNTING

Filed June 5, 1964     4 Sheets-Sheet 3

INVENTOR.
GERHARD SEEWALD

BY

ATTORNEY.

United States Patent Office 3,371,335
Patented Feb. 27, 1968

3,371,335
SYSTEM FOR MEASURING OF LENGTHS BY MEANS OF IMPULSE COUNTING
Gerhard Seewald, Altenmarkt (Alz), Germany, assignor to Firma Wenczler & Heidenhain, Traunstein, Germany, a corporation of Germany
Filed June 5, 1964, Ser. No. 372,749
Claims priority, application Germany, Apr. 22, 1964, W 36,634
5 Claims. (Cl. 340—347)

ABSTRACT OF THE DISCLOSURE

A system for measuring of lengths, the value to be determined as to its size and direction by impulse counting comprising a grid module, a line plate slidably disposed above and for movement parallel to the grid module, a plurality of scanning means disposed above the line plate, and a light source creating a light beam passing through the grid module and the line plate to the scanning means. The plurality of scanning means produces a plurality of output signals, respectively, with corresponding phase displacements relative to each other and a plurality of means are provided for applying coefficients to the plurality of output signals, respectively, to form coefficient modified output signals. A plurality of summation amplifier means each produces a summation signal from at least one of the coefficient modified signals from every scanning means and the number of the summation signals is equal to the number of the plurality of scanning means.

---

The present invention relates to a system for the measuring of lengths by means of impulse counting, in which a plurality of scanning points deliver output signals with a corresponding phase shift and the value to be measured is determined as to its size and direction by means of impulse counting.

A drawback in known devices of this type, is that with errors, such as for instance, incorrect division, as well as incorrectly mounted photo elements, a phase shift of the impulse signals is created.

Since rectangular impulse signals are produced from the phase-shifted impulse signals, the rectangular impulse signals result at least in an erroneous indication, if, under circumstances, the function of the following counting device is not question.

An equal phase position of the impulse signals is thus a prerequisite for accurate measurements.

It is, therefore, one object of the present invention to provide a system for measuring of lengths by means of impulse counting, wherein the above-stated drawback is avoided, and wherein equal phase positions of the impulse signals are created by means of the best possible error correction.

It is another object of the present invention to provide a system for the measuring of lengths by means of impulse counting, wherein in all output signals produced at the scanning points are applied with coefficients and are used for the formation of summation-signals and the same number of summation-signals are formed as the number of scanning points.

The advantage of the present invention resides in the fact, that, with respect to the phase position, the best possible error correction is achieved, since all output signals produced at the scanning points contribute to the formation of the summation-signals.

With these and other objects in view, which will become apparent in the following detailed description, the present invention will be clearly understood in connection with the accompanying drawings, in which.

Figure 1:
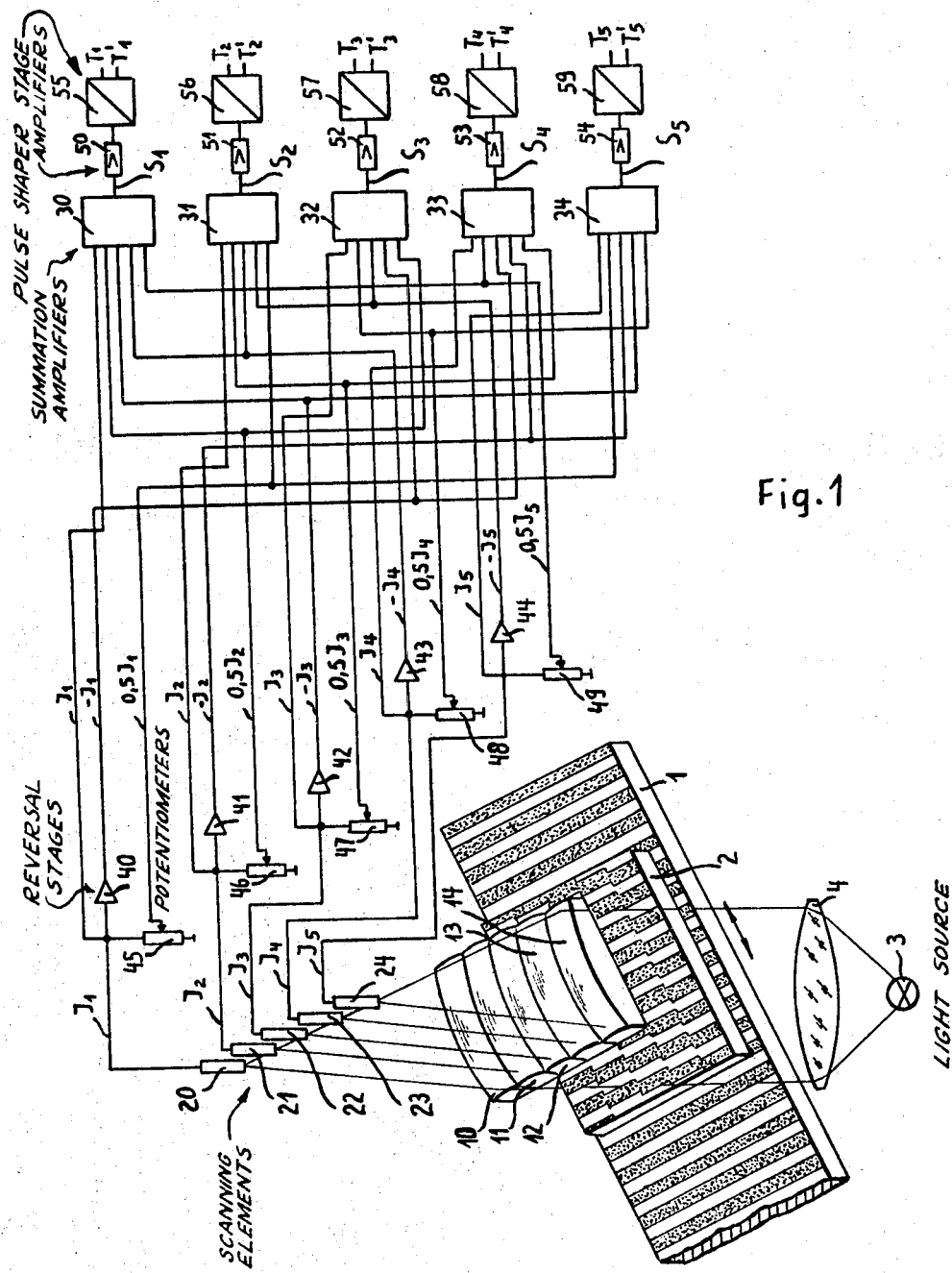
FIGURE 1 is a schematic illustration of a measuring apparatus designed in accordance with the present invention.

Referring now to the drawings, and in particular to the embodiment disclosed in FIG. 1, a photoelectric apparatus for measuring lengths is disclosed schematically. A grid module 1 as well as a line plate 2 sliding thereover, the relative position of which line plate 2 is to be measured relative to the grid module 1, are traversed by a beam of rays, which is produced from light source 3, through lens 4 and lenses 10, 11, 12, 13 and 14 and are received by light-sensitive scanning elements 20, 21, 22, 23 and 24. The light-sensitive scanning elements produce corresponding electrical output signals $I_1$, $I_2$, $I_3$, $I_4$ and $I_5$, respectively. The output signals $I_1$, $I_2$, $I_3$, $I_4$ and $I_5$ are each divided into three branch lines and are modified by applying coefficients thereto in the branch lines, such as for example, 1, —1, and 0.5, respectively, in accordance with the present invention for the summation-formation.

As shown in FIG. 1, the output signals $I_1$, $I_2$, $I_3$, $I_4$ and $I_5$, to which the coefficient 1 has been applied, are fed directly to the analogous summation-amplifiers 30, 31, 32, 33 and 34, respectively.

The output-signals $I_1$, $I_2$, $I_3$, $I_4$ and $I_5$, to which the coefficient —1 has been applied, by means of reversal stages 40, 41, 42, 43 and 44, and are fed to the analogous summation-amplifiers 30, 31, 32, 33 and 34.

The output-signals $I_1$, $I_2$, $I_3$, $I_4$ and $I_5$, to which the coefficient +0.5 has been applied, by means of adjustable potentiometers 45, 46, 47, 48 and 49 are fed to the analogous summation-amplifiers 30, 31, 32, 33 and 34.

The present invention is, of course, not limited to the coefficient values set forth above, rather it is possible to apply coefficients of other values to the output signals $I_1$, $I_2$, $I_3$, $I_4$ and $I_5$.

The summation-signals $S_1$, $S_2$, $S_3$, $S_4$ and $S_5$ are formed in the analogous summation-amplifiers 30, 31, 32, 33 and 34, according to the following equations, whereby:

$$S_1 = I_1 + 0.5 \cdot I_2 - I_3 - I_4 + 0.5 \cdot I_5$$
$$S_2 = I_2 + 0.5 \cdot I_3 - I_4 - I_5 + 0.5 \cdot I_1$$
$$S_3 = I_3 + 0.5 \cdot I_4 - I_5 - I_1 + 0.5 \cdot I_2$$
$$S_4 = I_4 + 0.5 \cdot I_5 - I_1 - I_2 + 0.5 \cdot I_3$$
$$S_5 = I_5 + 0.5 \cdot I_1 - I_2 - I_3 + 0.5 \cdot I_4$$

and the sum of the coefficients in $S_1$, $S_2$, $S_3$, $S_4$ and $S_5$ equals zero.

The summation-signals $S_1$, $S_2$, $S_3$, $S_4$, $S_5$ are fed to amplifiers 50, 51, 52, 53 and 54 and then to pulse shaper-stages 55, 56, 57, 58 and 59.

Figure 2:
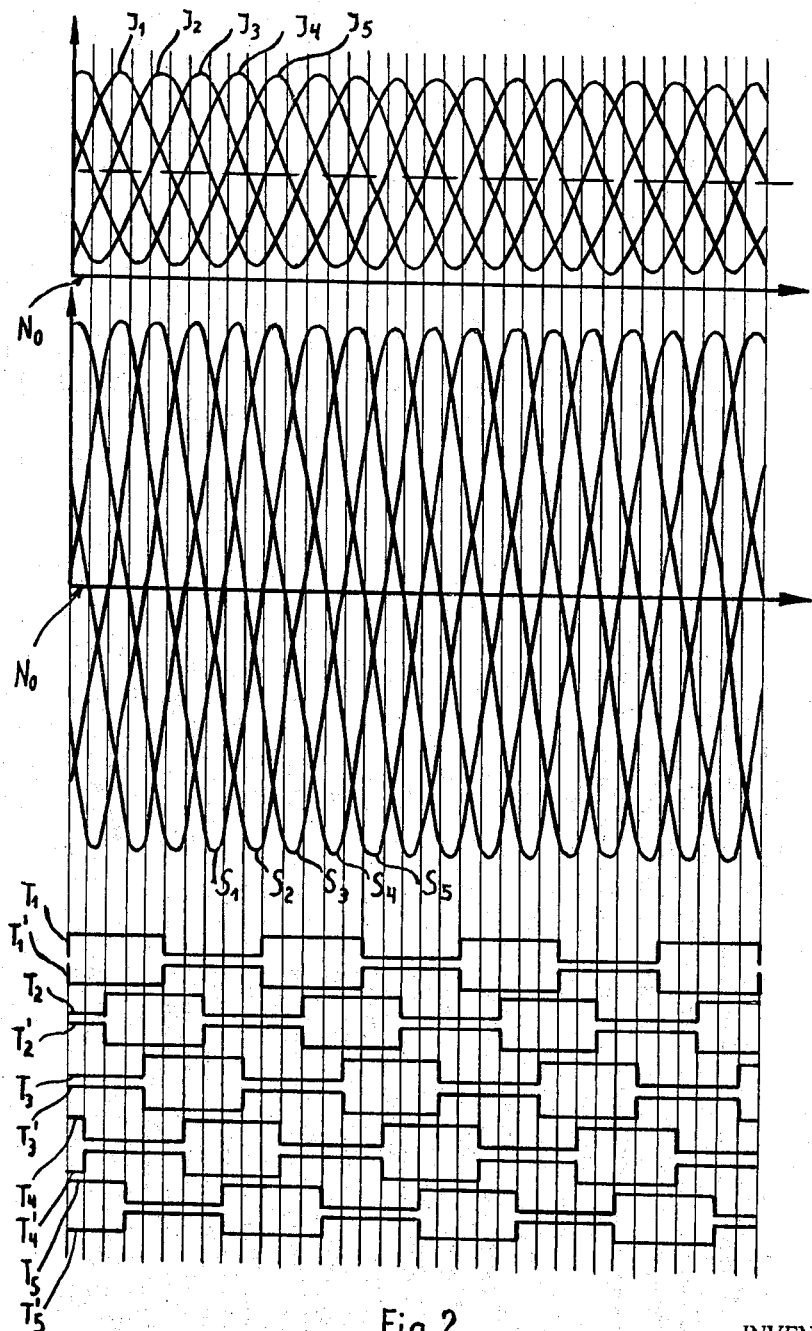
FIG. 2 is a diagrammatic showing of the output signals and of the summation-signals formed therefrom, as well as the rectangular impulse-signals deducted from the summation-signals.

Referring now again to the drawings, and in particular to FIG. 2, output signals $I_1$, $I_2$, $I_3$, $I_4$ and $I_5$ are shown shifted relative to each other by an angle of 72°, as well as the summation-signals $S_1$, $S_2$, $S_3$, $S_4$ and $S_5$ formed therefrom, which are dependent upon the path traversed. The summation signals $S_1$, $S_2$, $S_3$, $S_4$ and $S_5$ are transformed into the rectangular impulse signals $T_1$, $T_2$, $T_3$, $T_4$ and $T_5$, respectively as well as corresponding inverse impulse-signals $T_1'$, $T_2'$, $T_3'$ $T_4'$ and $T_5'$, respectively by the pulse shaper-stages 55, 56, 57, 58 and 59, which respond to the signal level $N_0$. The pulse shaper-stages may include any well known trigger circuits which convert a signal, $S_1$–$S_5$ (FIG. 2) into rectangular signals $T_1$–$T_5$.

Figure 3:
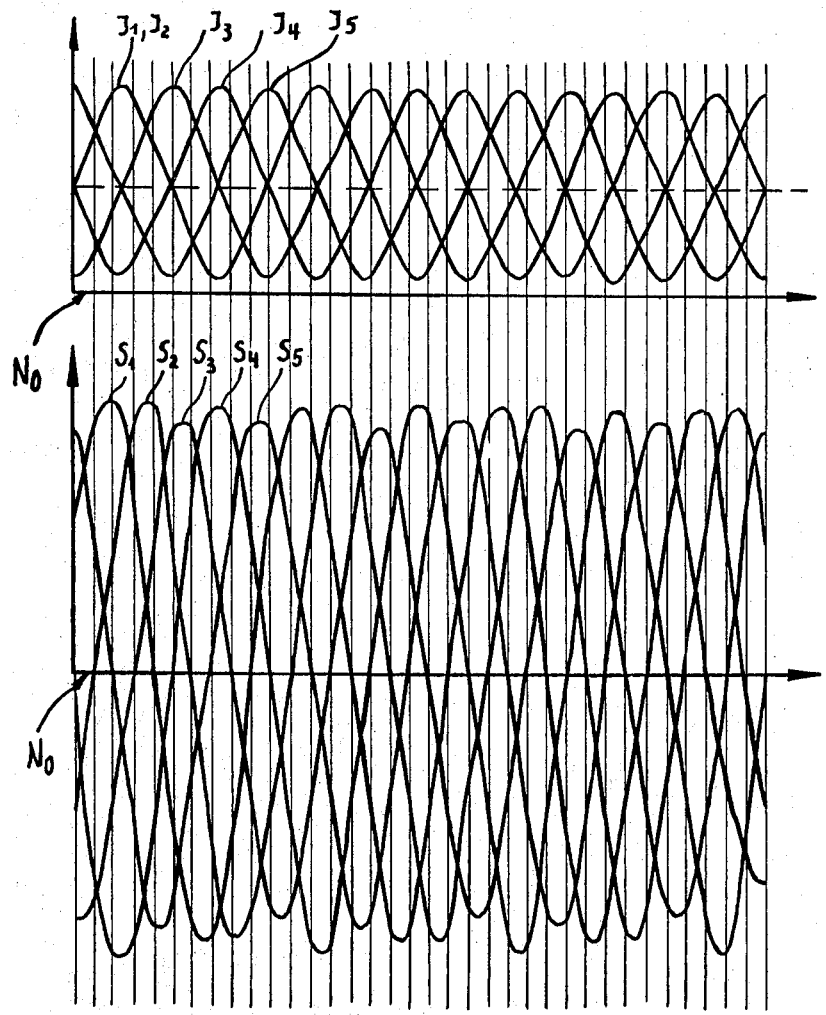
FIG. 3 is a diagrammatic showing of incorrect output signals, as well as of the summation-signals deducted therefrom.

FIG. 3 discloses the output signals $I_1$, $I_2$, $I_3$, $I_4$ and $I_5$ similar to the showing in FIG. 2, however, with a different phase-angle.

It will become apparent from a comparison from the showing in FIGS. 2 and 3, that even at the occasion of the coarsest phase-angle errors of the output signals $I_1$, $I_2$, $I_3$, $I_4$ and $I_5$, the summation signals $S_1$, $S_2$, $S_3$, $S_4$ and $S_5$ produced therefrom divide the level $N_0$ into equal sections (FIG. 2), and thus the phase-angle errors have no influence upon the phase position of the rectangular impulse signals $T_1$, $T_1'$, $T_2$, $T_2'$ $T_3$, $T_3'$, $T_4$, $T_4'$, $T_5$ and $T_5'$ (FIG. 2).

Figure 4:
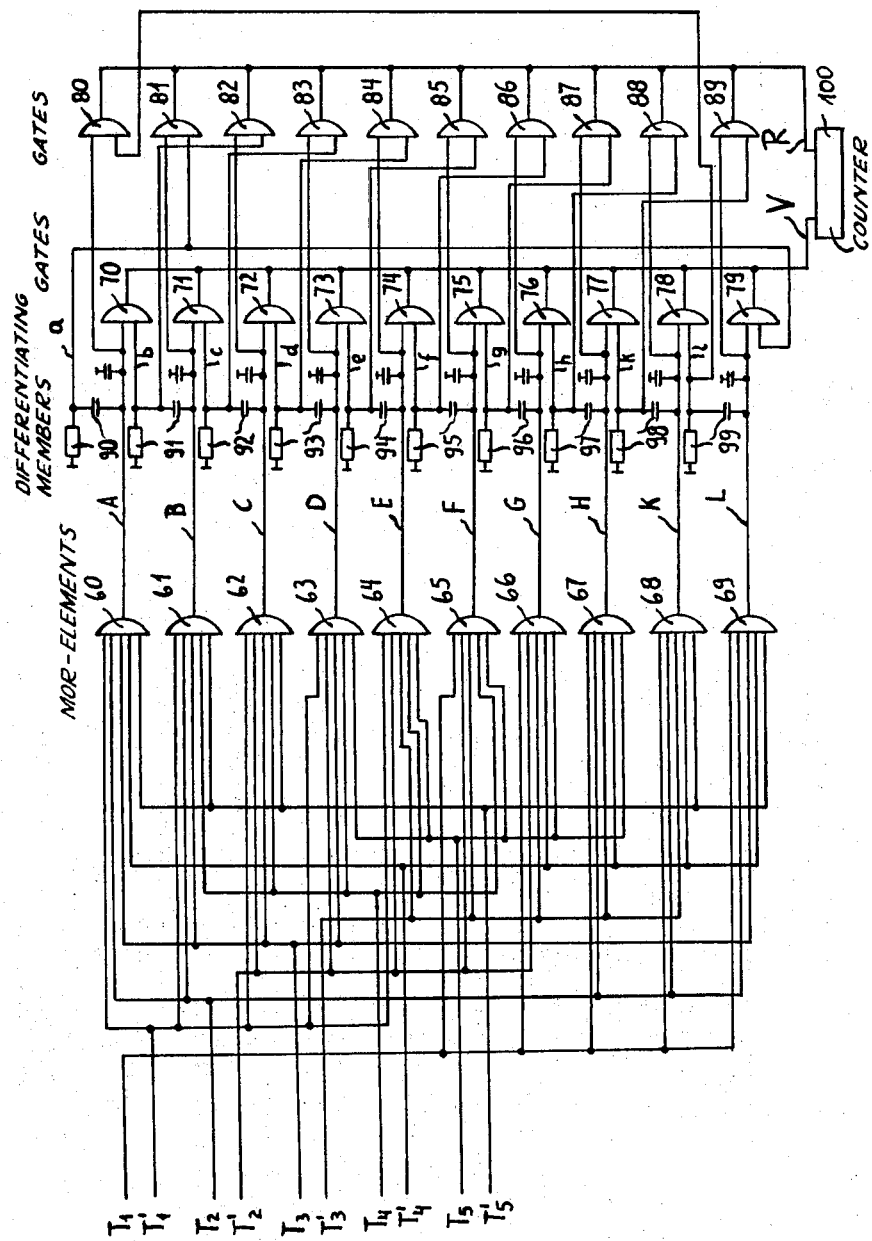
FIG. 4 is a schematic diagram of the logical network for exploitation of the rectangular impulse-signals disclosed in FIG. 2.

Referring now again to the drawings, and more particular to FIG. 4, the rectangular impulse lines $T_1$, $T_1'$, $T_2$, $T_2'$ $T_3$, $T_3'$ $T_4$, $T_4'$ $T_5$ and $T_5'$ are connected with Nor-elements 60, 61, 62, 63, 64, 65, 66, 67, 68 and 69. The output signals of the Nor-elements 60–69, that is signals A, B, C, D, E, F, G, H, K and L, respectively are connected with a logic network, comprising gates 70–79 and 80–89, and which operates in accordance with the following equations:

$$V \text{ (forward)} = A \cdot b + B \cdot c + C \cdot d + D \cdot e + E \cdot f + F \cdot g + G \cdot h + H \cdot k + K \cdot l + L \cdot a$$

$$R \text{ (backward)} = A \cdot l + B \cdot a + C \cdot b + D \cdot c + E \cdot d + F \cdot e + G \cdot f + H \cdot g + K \cdot h + L \cdot k$$

wherein, due to the Nor-elements 60–69 and the input connections thereto:

$$A = T_1 \cdot T_2' \cdot T_3' \cdot T_4' \cdot T_5$$
$$B = T_1 \cdot T_2' \cdot T_3' \cdot T_4' \cdot T_5$$
$$C = T_1 \cdot T_2 \cdot T_3' \cdot T_4' \cdot T_5$$
$$D = T_1 \cdot T_2 \cdot T_3' \cdot T_4' \cdot T_5'$$
$$E = T_1 \cdot T_2 \cdot T_3 \cdot T_4' \cdot T_5'$$
$$F = T_1' \cdot T_2 \cdot T_3 \cdot T_4' \cdot T_5'$$
$$G = T_1' \cdot T_2 \cdot T_3 \cdot T_4 \cdot T_5'$$
$$H = T_1' \cdot T_2' \cdot T_3 \cdot T_4 \cdot T_5'$$
$$K = T_1' \cdot T_2' \cdot T_3 \cdot T_4 \cdot T_5$$
$$L = T_1' \cdot T_2' \cdot T_3' \cdot T_4 \cdot T_5$$

The values $a$, $b$, $c$, $d$, $e$, $f$, $g$, $h$, $i$, $k$, and $l$ are time discharge signals for the corresponding impulse signals A, B, C, D, E, F, G, H, I, K and L and are produced by means of the differentiating members 90–99. The pulses V and R are sent to a counter 100.

For the indication of the multiple of a non-whole member of an interval of a division, it is possible to connect the ten output terminals of the Nor-elements 60–69, that is, the conduits through which the signals A–L pass, directly to an indication device. The indication device can, thereby, be designed, for instance, in the form of light signals in the form of numbers, which light signals are disposed spacially in series.

The present invention is, of course, not limited to devices in which the signals are obtained by photo-electric means. It can be applied with the same advantage also to devices with, for instance, capacitive or inductive signal formation.

While I have disclosed one embodiment of the present invention, it is to be understood that this embodiment is given by example only and not in a limiting sense, the scope of the present invention being determined by the objects and the claims.

I claim:

1. A system for measuring lengths, the value to be measured determined as to its size and direction by impulse counting comprising
   a grid module,
   a line plate slidably disposed above and for movement parallel to said grid module,
   means for measuring the relative position of said line plate and said grid module, comprising,
   a plurality of scanning means disposed above said line plate,
   a light source creating a light beam passing through said grid module and said line plate to said scanning means,
   said plurality of scanning means for producing a plurality of output signals, respectively, with corresponding phase displacements relative to each other,
   a plurality of means for applying coefficients to said plurality of output signals to form coefficient modified output signals,
   a plurality of summation amplifier means each for producing a summation signal from at least one of said coefficient modified signals from every scanning means, and
   the number of said summation signals is equal to the number of said plurality of said scanning means.

2. The system, as set forth in claim 1, wherein
   the number of said scanning means is five, and
   the number of said summation signals is five, and said system further including,
      a plurality of pulse-shaper stages receiving said summation signals for producing therefrom a plurality of corresponding rectangular impulse signals, $T_1$–$T_5$, respectively, and inverted rectangular impulse signals, $T_1'$–$T_5'$, respectively, and
      a logical network operatively connected with the output of said pulse-shaper stages for receiving said rectangular impulse signals and said inverted rectangular impulse signals, and counting the positive and negative switching jumps.

3. The system as set forth in claim 2, wherein
   said logical network includes Nor-elements, AND-gates, and differentiating members,
   said Nor-elements connected to receive said rectangular impulse signals and to produce the following outputs, respectively, $$A = T_1 \cdot T_2' \cdot T_3' \cdot T_4' \cdot T_5$$
$$B = T_1 \cdot T_2' \cdot T_3' \cdot T_4' \cdot T_5$$
$$C = T_1 \cdot T_2 \cdot T_3' \cdot T_4' \cdot T_5$$
$$D = T_1 \cdot T_2 \cdot T_3' \cdot T_4' \cdot T_5'$$
$$E = T_1 \cdot T_2 \cdot T_3 \cdot T_4' \cdot T_5'$$
$$F = T_1' \cdot T_2 \cdot T_3 \cdot T_4' \cdot T_5'$$
$$G = T_1' \cdot T_2 \cdot T_3 \cdot T_4 \cdot T_5'$$
$$H = T_1' \cdot T_2' \cdot T_3 \cdot T_4 \cdot T_5'$$
$$K = T_1' \cdot T_2' \cdot T_3 \cdot T_4 \cdot T_5$$
$$L = T_1' \cdot T_2' \cdot T_3' \cdot T_4 \cdot T_5$$

said AND-gates connected to produce the following signals $$V \text{ (forward)} = A \cdot b + B \cdot c + C \cdot d + D \cdot e + E \cdot f + F \cdot g + G \cdot h + H \cdot k + K \cdot l + L \cdot a$$

$$R \text{ (rearward)} = A \cdot l + B \cdot a + C \cdot b + D \cdot c + E \cdot d + F \cdot e + G \cdot f + H \cdot g + K \cdot h + L \cdot k,$$

where $a$, $b$, $c$, $d$, $e$, $f$, $g$, $h$, $i$, $k$ and $l$ are time discharge signals produced by said differentiating members for the corresponding outputs A, B, C, D, E, F, G, H, I, K and L, respectively.

4. The system, as set forth in claim 1, wherein said means for applying coefficient to said output signals comprises adjustable potentiometers.

5. The system, as set forth in claim 1, wherein said means for applying coefficient to said output signals comprises resistances.

References Cited
UNITED STATES PATENTS

| | | | |
|---|---|---|---|
| 3,056,029 | 9/1962 | Budnick | 88—14 X |
| 3,070,700 | 12/1962 | Budnick | 88—14 X |
| 3,182,207 | 5/1965 | Kaufmann | 328—44 X |
| 3,255,359 | 6/1966 | Hempel. | |
| 3,311,749 | 3/1967 | Briggs | 88—14 X |

MAYNARD R. WILBUR, *Primary Examiner.*

JEWELL H. PEDERSEN, *Examiner.*

W. J. KOPACZ, A. A. KASHINSKI,
*Assistant Examiners.*